Patented Feb. 2, 1932

1,843,321

UNITED STATES PATENT OFFICE

MAX HAMBURG, OF VIENNA, AUSTRIA, ASSIGNOR OF ONE-HALF TO EDUARD JALOWETZ, OF VIENNA, AUSTRIA

PREVENTING FORMATION OF UNPLEASANT FLAVOR IN FERMENTED CEREAL BEVERAGES

No Drawing. Application filed March 15, 1928, Serial No. 262,024, and in Austria January 13, 1926.

The kind and the quantity of the albuminous substances contained in any particular wort has a well known effect upon the flavor and on the taste of the beer made therefrom.

Especially the formation of the so-called "young bouquet substances" is caused by the presence of certain albuminous matters and by the presence of volatile constituents in the malt worts, which constituents have been partly formed in the malt. Such substances have not vanished from the beer when the latter gets ripened, although the ripening process takes a long time.

The term "young boquet substances" (also called in German jungbukett-substances) as employed herein is a term used in the art to designate substances of unknown composition present in new beer, beer still undergoing fermentation, and sometimes present in mature beer, which produce a disagreeable flavor and taste in the beer. As some of the constituents are very difficult to remove the taste of the final beer is frequently injured thereby.

Very many different methods have been tried for removing these disagreeable substances. Reference is made especially to the method of Nathan, who improved the brewing considerably by the use of the starting-back, by which the separation of the undesired albuminous substances is accelerated. Nathan tried to remove the volatile components of the wort by washing the wort with carbon dioxide.

I have found by a long series of experiments that it is possible to prevent the formation of substances in the beer giving it an unpleasant flavor and taste, especially of the above mentioned "young bouquet substances" in a very simple way, when, according to my invention the wort after boiling with hops is, before fermentation, exposed for some time to a strong cooking in vacuum at a temperature up to about 70° C., until the above mentioned albuminous matters are precipitated, the precipitate being thereafter removed. The same effect can be secured by dispersing the wort in a heated vacuum chamber. The wort may be mixed also with small quantities of tannin (for instance 10 gr. of tannin per hectoliter) before being subjected to the vacuum treatment above stated.

On account of the vigorous agitation produced by and during the treatment in vacuum, a conglomeration of these undesirable tannic or hop-tannic albuminous matters and thereby a nearly total precipitation is effected. These albuminous matters, which cause a fine turbidness of the wort after cooling down, are, as H. Brown proved, although present in the wort only in a very small quantity, nevertheless they cause the known disagreeable effect in the taste of the beer, before the same has been not sufficiently ripened.

My process accomplishes the precipitation of the albuminous matters and simultaneously the removal of the volatile constituents which cause the disagreeable taste and flavor of the wort and which constituents will volatilize with the aqueous vapors. I have demonstrated the surprising fact that these volatile constituents of disagreeable flavor and unsavory taste in the wort are in a very great quantity contained in the distillate obtained. Having precipitated the albuminous matters and removed the volatile constituents of the wort to a sufficient degree which will usually be the case when the wort is reduced approximately to one-half or one-third of its original volume, I cool and remove the precipitated albuminous matters from the wort; thereafter the wort is to be treated in the manner generally followed in brewing.

The wort produced in the above described manner ferments very vigorously and also the after-fermentation is finished within a short time. In consequence of the precipitation and removal of the albuminous matters and of the volatile constituents which cause the disagreeable flavor and taste of the malt-worts and of the beer-worts, the ripening of the beer takes place within a few days. The beer produced from this wort has an agreeable taste and is free from the so-called "young bouquet flavor or taste" and is fit for drinking therefore in a short time. It was supposed hereto that the materials producing the disagreeable flavor and taste were formed during the fermentation, but by my method it is shown that these materials are contained in the beer-wort. By removing these materials in the manner described, it is possible to hold the agreeable flavoring matters of the hops free from contamination.

In producing beers free from alcohol I impregnate the wort treated in the manner above described, with carbonic acid.

I claim:—

1. A process of producing fermented cereal beverage free from unpleasant flavor and taste which comprises boiling the wort with hops, then subjecting wort boiled with hops to a strong cooking in vacuum for a sufficiently long time to precipitate the albuminous substances therein, removing such precipitate and thereafter causing the wort to ferment.

2. A process of preventing the formation of unpleasant flavor and taste in fermented cereal beverage which comprises boiling the wort with hops, then subjecting wort boiled with hops to a strong cooking in vacuum at a temperature up to about 70° C., for a sufficient period to precipitate the albuminous constituents, and thereafter removing the precipitate.

3. In the process according to claim 1, the steps of mixing the wort with small quantities of tannin, before the vacuum cooking step.

4. A process of producing fermented cereal beverage free from unpleasant flavor and taste which comprises boiling the wort with hops, then exposing the wort boiled with hops to a strong cooking in vacuum throughout a sufficiently long time to precipitate the albuminous substances therein, thereafter removing such precipitate and subsequently impregnating the treated wort with carbon dioxide.

In testimony whereof I affix my signature.

Dr. MAX HAMBURG.